United States Patent
Scheer et al.

(10) Patent No.: US 9,571,995 B1
(45) Date of Patent: Feb. 14, 2017

(54) CALL TRANSFER INITIATION VIA NEAR FIELD COMMUNICATION (NFC)

(71) Applicant: Verizon Patent and Licensing Inc., Arlington, VA (US)

(72) Inventors: Fred Scheer, North Andover, MA (US); Elliot G. Eichen, Arlington, MA (US); Toygar Yagci, Boston, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/877,577

(22) Filed: Oct. 7, 2015

(51) Int. Cl.
*H04W 4/16* (2009.01)
*H04W 4/02* (2009.01)
*H04W 4/00* (2009.01)
*H04M 3/58* (2006.01)

(52) U.S. Cl.
CPC .......... *H04W 4/16* (2013.01); *H04M 3/58* (2013.01); *H04W 4/008* (2013.01); *H04W 4/023* (2013.01)

(58) Field of Classification Search
CPC .......... H04W 4/16; H04W 4/008; H04W 8/20; H04W 76/02; H04M 3/543; H04M 3/5183; H04M 1/72525; H04M 3/58; H04M 3/54; H04M 3/42059; H04M 3/493; H04M 3/5116; H04M 3/44; G06F 17/30554; G06F 17/30528; H04N 7/01
USPC 455/417, 418, 558, 414.1, 466; 379/201.04, 207.12, 25, 88.01; 704/249
See application file for complete search history.

(56) References Cited

U.S. PATENT DOCUMENTS

2013/0115932 A1* 5/2013 Williams ............... H04M 3/58 455/417
2016/0019896 A1* 1/2016 Alvarez Guevara ... G10L 15/08 704/249

* cited by examiner

*Primary Examiner* — Phuoc H Doan (57) ABSTRACT

A first device may detect that a second device is within communicative proximity for a near field communication connection with the first device, and may establish the near field communication connection with the second device. The first device may determine that the first device and the second device are provisioned with a same telephone number, determine that the first device is a destination for a call to be transferred, and request a transfer of the call.

20 Claims, 5 Drawing Sheets

CALL TRANSFER INITIATION VIA NEAR FIELD COMMUNICATION (NFC)

BACKGROUND

Near field communication (NFC) enables contactless communication between electronic devices through the usage of magnetic field induction. NFC enabled devices may wirelessly exchange power and data when brought into communicative proximity of each other. In this way, two NFC enabled devices may seamlessly exchange information.

DETAILED DESCRIPTION OF PREFERRED EMBODIMENTS

The following detailed description of example implementations refers to the accompanying drawings. The same reference numbers in different drawings may identify the same or similar elements.

A user may have multiple call devices (e.g., a personal smart phone, an office desk phone, a tablet phone, etc.) provisioned with a same telephone number (e.g., a business telephone number). In some instances, the user may want to transfer a call between the call devices. For example, during a commute to work, the user may conduct a call on a first call device, such as a personal smart phone. After arriving at work, the user may want to transfer the call from the first call device to a second call device, such as an office desk phone, without terminating the call. The user may do so by manually entering a vertical service code (VSC) (e.g., a star code) using the office desk phone. The VSC may represent a particular sequence of characters and/or digits that, when dialed, causes a particular function (e.g., request a call transfer) to be performed. Such a method may require that a user remember one or more VSCs and that the user manually input a VSC on the office desk phone. The user may institute a speed dial for the VSC, however, the user may still be required to provide manual input during a call transfer request. Moreover, the user may input an incorrect VSC. Implementations described herein may assist the user in seamlessly initiating a transfer of the call from the first call device to the second call device via NFC.

Figure 1A:
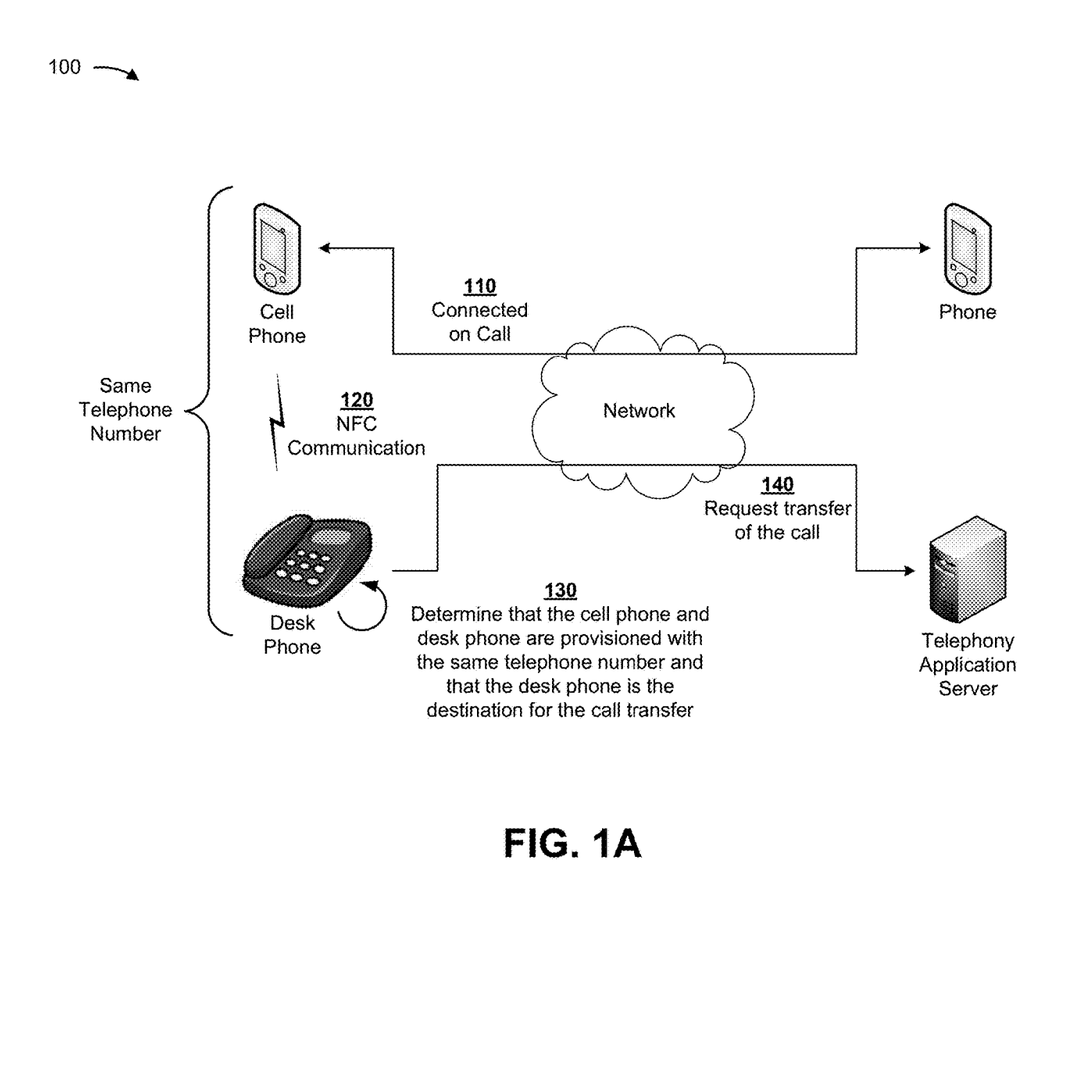
FIGS. 1A and 1B are diagrams of an overview of an example implementation described herein.
Figure 1B:
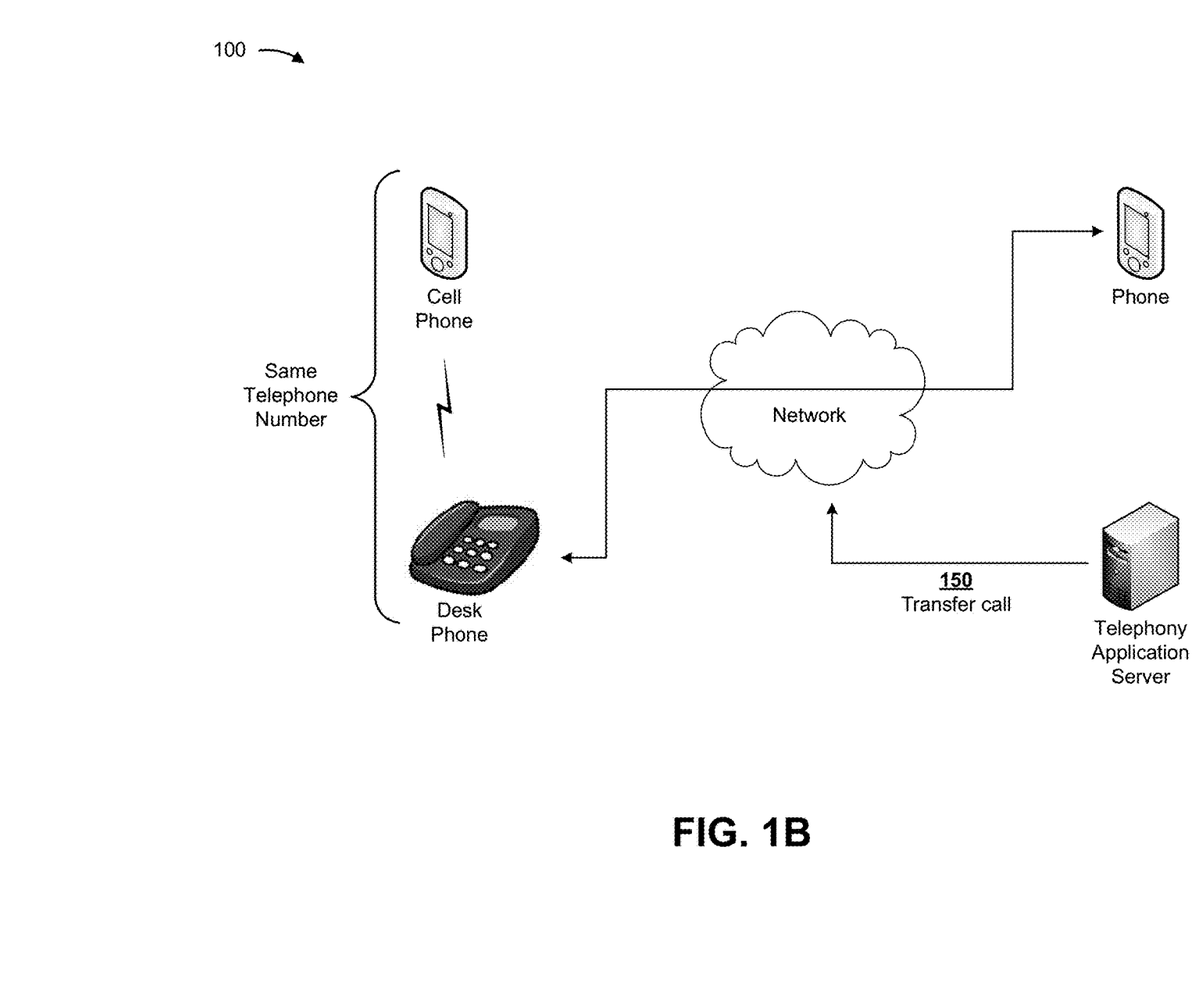

FIGS. 1A and 1B are diagrams of an overview of an example implementation 100 described herein. As shown in FIG. 1A, example implementation 100 may include a first call device (e.g., a cell phone) that is provisioned with a same telephone number as a second call device (e.g., an office desk phone). As shown by reference number 110, the first call device may be connected on a call with, for example, a third call device (e.g., a cell phone, a landline phone, etc.). A user may desire to transfer the call from the first call device (e.g., the source) to the second call device, such as an office desk phone (e.g., the destination), that may be provisioned with a same telephone number as the first call device (e.g., a business telephone number).

As shown by reference number 120, the second call device (e.g., the office desk phone) may detect an NFC event when the first call device (e.g., the cell phone) is brought into communicative proximity with the second call device. As shown by reference number 130, the second call device may determine that the first call device and the second call device are provisioned with the same telephone number and that the second call device is the destination for the call transfer. As shown by reference number 140, the second call device may transmit a call transfer request to a telephony application server, which may be in communication with the first call device, the second call device, and the third call device via a network.

As shown in FIG. 1B, and by reference number 150, the telephony application server may transfer the call to the second call device (e.g., the desk phone). For example, based on receiving the call transfer request, the telephony application server may establish a communication link between the third call device and the second call device. Further, the telephony application server may terminate a communication link between the third call device and the first call device. In this way, the call between the first call device and the third call device may be seamlessly transferred to the second call device based on initiating the call transfer via NFC. Moreover, as compared to manually entering VSCs, implementations described herein may allow a user to transfer the call from the first call device to the second call device by simply bringing the first call device and the second call device within communicative proximity of one another. In this way, the first call device and/or the second call device may save processor and/or memory resources by not having to process VSCs. Moreover, memory and/or processor resources may be saved by not having to process possibly incorrect VSCs.

Figure 2:
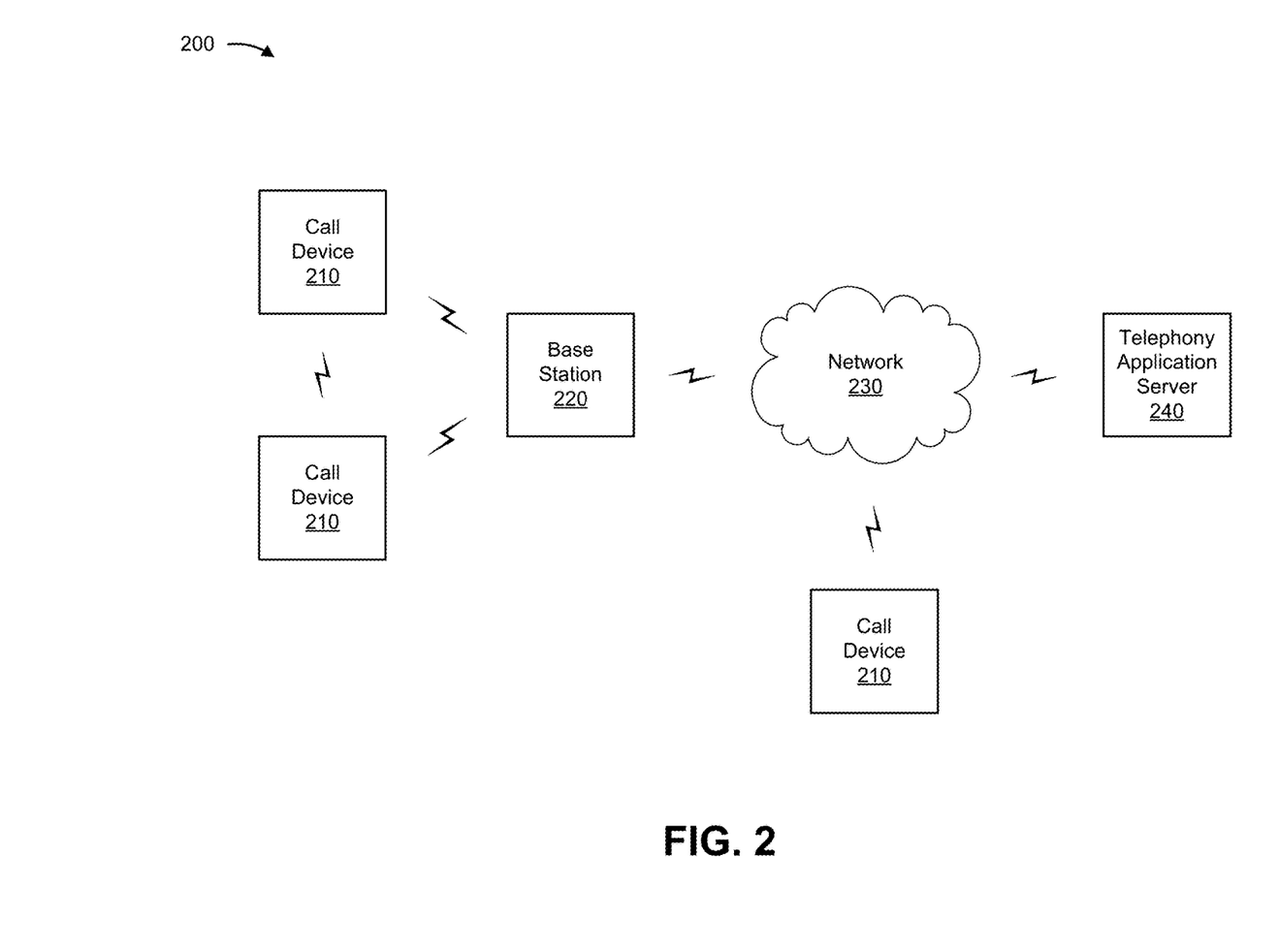
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include multiple call devices 210 (hereinafter referred to individually as "call device 210," and collectively as "call devices 210"), a base station 220, a network 230, and a telephony application server 240. Devices of environment 200 may interconnect via wired connections, wireless connections, or a combination of wired and wireless connections.

Call device 210 may include one or more devices capable of participating in a phone call with one or more other call devices 210 (e.g., via network 230). For example, call device 210 may include a wireless telephone (e.g., a wireless communication device, a radiotelephone, a smart phone, a tablet computer, etc.), a wireline telephone (e.g., a land-line phone, an office phone, a fixed-line phone, etc.), and/or a similar device. In some implementations, (e.g., when call device 210 is a wireless telephone), call device 210 may send traffic to and/or receive traffic from network 230 via base station 220. In some implementations (e.g., when call device 210 is a wireline telephone), call device 210 may communicate via network 230 without using base station 220. Call device 210 may include a contactless interface (e.g., an NFC interface) for communicating with one or more other call devices 210.

In some implementations, environment 200 may include a first call device 210 and a second call device 210 that share a telephone number. One or more devices of environment 200 may assist with transferring a call, between first call device 210 and a third call device 210, from first call device 210 to second call device 210. In other words, a call may be established between second call device 210 and third call device 210, and a call between first call device 210 and third call device 210 may be terminated.

Base station 220 may include one or more devices capable of communicating with call device 210 using a cellular radio access technology. For example, base station 220 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between call device 210 and network 230. In some implementations, base station 220 may communicate with call device 210 (and/or one or more other devices) using radio waves.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Telephony application server 240 may include one or more devices that assist with managing functions associated with a telephone call. For example, telephony application server 240 may include one or more server devices for implementing Voice over LTE (VoLTE) services, or other telephone services, in network 230. Telephony application server 240 may handle calls associated with call devices 210. For example, telephony application server 240 may create, modify, and/or terminate calls between call devices 210. In some implementations, telephony application server 240 may route calls to a call device 210, provide a user the ability to answer a call on a first call device 210, and/or provide the user the ability to answer the call on a second call device 210. Additionally, or alternatively, telephony application server 240 may transfer calls between call devices 210 based on a request from call device 210.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
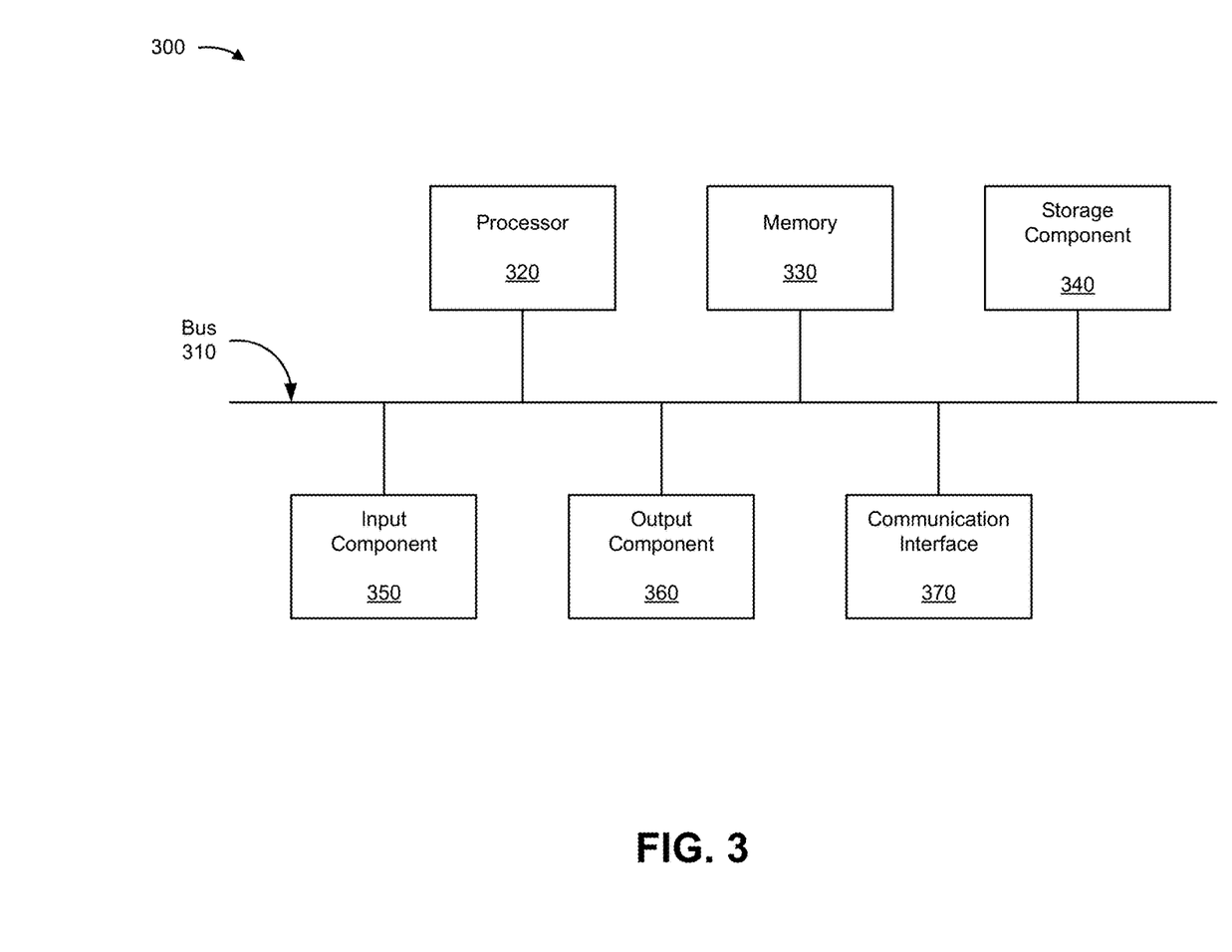
FIG. 3 is a diagram of example components of one or more devices of FIG. 2.

FIG. 3 is a diagram of example components of a device 300. Device 300 may correspond to call device 210, base station 220, and/or telephony application server 240. In some implementations, call device 210, base station 220, and/or telephony application server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an NFC interface, an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
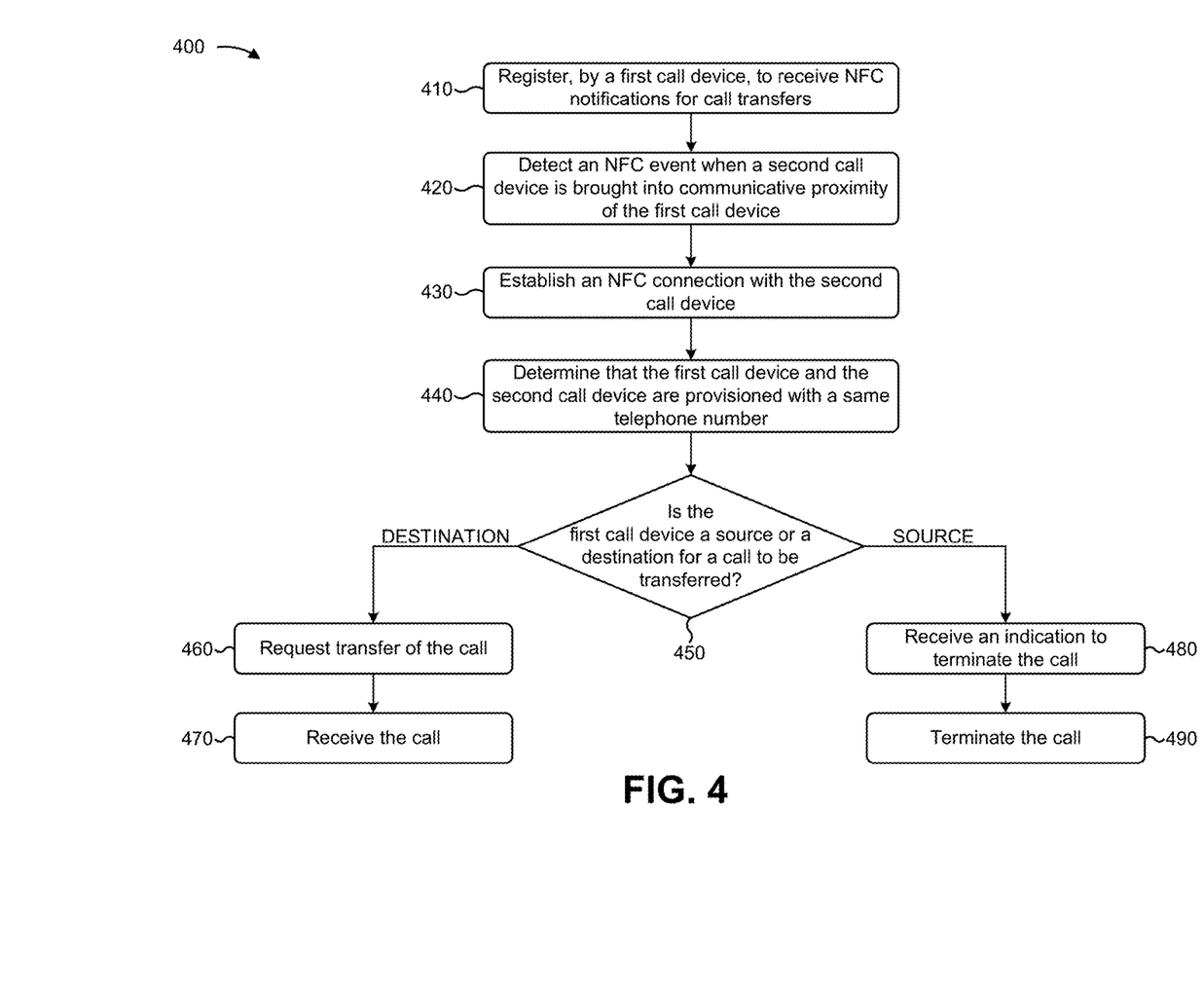
FIG. 4 is a flow chart of an example process for initiating call transfer via NFC.

FIG. 4 is a flow chart of an example process 400 for initiating a call transfer via NFC. In some implementations, one or more process blocks of FIG. 4 may be performed by call device 210. In some implementations, one or more process blocks of FIG. 4 may be performed by another device or a group of devices separate from or including call device 210, such as base station 220 and/or telephony application server 240.

As shown in FIG. 4, process 400 may include registering, by a first call device, to receive NFC notifications for call transfers (block 410). For example, first call device 210 may register to receive NFC notifications for call transfers by installing an NFC application, which may interact with an operating system of first call device 210. For example, based on an NFC trigger, the operating system of first call device 210 may notify the NFC application that an NFC event has occurred and/or is occurring. In some implementations, the NFC trigger may be detected based on an RF field generated by a second call device 210. For example, second call device 210 may generate an RF field (e.g., may act as an NFC initiator) to power and/or communicate with first call device 210 (e.g., which may act as an NFC target). In this way, second call device 210 may establish a near field communication connection with first call device 210. For example, second call device 210 may transmit data to first call device 210 using RF signals. An NFC event may include an NFC transmission from second call device 210 to first call device 210. In some implementations, an NFC event may include data communication between second call device 210 and first call device 210 (e.g., first call device 210 and/or second call device 210 may transmit and/or receive data).

An NFC notification may include an RF signal having one or more instructions. For example, second call device 210 may transmit an instruction to first call device 210 to request a call transfer (e.g., a call transfer request). Additionally, or alternatively, first call device 210 may transmit a call transfer request to second call device 210. Based on receiving the NFC notification, first call device 210 may perform the one or more instructions (e.g., to request the call transfer). In some implementations, first call device 210 may determine to request a call transfer based on detecting an NFC trigger (e.g., an RF field of second call device 210).

As further shown in FIG. 4, process 400 may include detecting an NFC event when a second call device is brought into communicative proximity of the first call device (block 420). For example, first call device 210 may receive a wireless signal from second call device 210 when second call device 210 is brought into communicative proximity of first call device 210. Additionally, or alternatively, first call device 210 may transmit a wireless signal to second call device 210 when second call device 210 is brought into communicative proximity of first call device 210. Based on detecting that the second call device 210 is within communicative proximity, first call device 210 may establish a near field communication connection with second call device 210. In some implementations, communicative proximity may include an NFC range (e.g., a threshold range for transmitting and/or receiving NFC notifications). For example, first call device 210 may detect an NFC event when second call device 210 is brought within a threshold distance from first call device 210 (e.g., 15 cm, 10 cm, 5 cm, or the like). Additionally, or alternatively, first call device 210 may detect an NFC event when second call device 210 physically touches first call device 210. In this way, inadvertent call transfers may be prevented (e.g., when first call device 210 and second call device 210 coincidentally happen to be in communicative proximity, but are not physically touching).

As further shown in FIG. 4, process 400 may include establishing an NFC connection with the second call device (block 430). For example, first call device 210 may establish an NFC connection with second call device 210 when located within communicative proximity of second call device 210. In some implementations, first call device 210 and second call device 210 may perform an authentication operation associated with the NFC connection. For example, first call device 210 may exchange authentication information with second call device 210, and vice versa. Following the authentication operation, first call device 210 may wirelessly communicate with second call device 210. For example, first call device 210 and second call device 210 may communicate for a threshold amount of time. In some implementations, the threshold amount of time may be the time for first call device 210 to transmit an NFC notification to second call device 210. Additionally, or alternatively, the threshold amount of time may be the time for first call device 210 to receive an NFC notification from second call device 210. Additionally, or alternatively, the threshold amount of time may be the time during which first call device 210 and second call device 210 remain in communicative proximity.

As further shown in FIG. 4, process 400 may include determining that the first call device and the second call device are provisioned with a same telephone number (block 440). For example, first call device 210 may verify that first call device 210 and second call device 210 are provisioned with the same telephone number (e.g., a mobile directory number (MDN)). In some implementations, first call device 210 may execute a Voice over IP (VoIP) application and may be provisioned with multiple telephone numbers (e.g., a personal telephone number and a business telephone number). First call device 210 may verify that a provisioned telephone number (e.g., either a personal telephone number and/or a business telephone number) matches a provisioned telephone number of second call device 210. For example, first call device 210 may verify that a business telephone number, associated with an application of first call device 210 (e.g., a VoIP application), matches a telephone number of second call device 210.

In some implementations, first call device 210 may request that second call device 210 provide information that identifies a telephone number, provisioned to second call device 210, to first call device 210. Additionally, or alternatively, telephony application server 240 may provide information that identifies a telephone number, provisioned to second call device 210, to first call device 210. After receiving the information that identifies the provisioned telephone number, first call device 210 may compare the provisioned telephone number of second call device 210 to a provisioned telephone number of first call device 210. In this way, first call device 210 may verify that a provisioned telephone number of second call device 210 matches a provisioned telephone number of first call device 210. In some implementations, telephony application server 240 may verify that a provisioned telephone number of second call device 210 matches a provisioned telephone number of first call device 210, and may provide information that indicates whether the provisioned telephone numbers match.

As further shown in FIG. 4, process 400 may include determining whether the first call device is a source or destination for a call to be transferred (block 450). For example, first call device 210 may determine a call state of first call device 210 and/or second call device 210. The call state may indicate whether first call device 210 (or second call device 210) is currently on a call (e.g., with third call device 210). In some implementations, first call device 210 may determine a call state of second call device 210 by requesting that second call device 210 to provide a call state to first call device 210. Based on the request, second call device 210 may provide, to first call device 210, information that identifies the call state of second call device 210. Additionally, or alternatively, telephony application server 240 may provide, to first call device 210, information that identifies a call state of second call device 210.

In some implementations, first call device 210 and second call device 210 may negotiate a movement direction of the call (e.g., to determine a source and/or a destination of a call transfer). For example, if first call device 210 determines that second call device 210 is currently on a call with third call device 210, and/or determines that first call device 210 is not currently on a call, then first call device 210 may determine that second call device 210 is the source of the call and/or that first call device 210 is the destination for the call. Additionally, or alternatively, if first call device 210 determines that first call device 210 is currently on a call with third call device 210, and/or determines that second call device 210 is not currently on a call, then first call device 210 may determine that second call device 210 is the destination for the call and/or that first call device 210 is the source of the call. In some implementations, second call device 210 may determine that second call device 210 is the source of the call transfer, and may instruct first call device 210 to request the call transfer.

As further shown in FIG. 4, if the first call device is a destination for the call to be transferred (block 450—DESTINATION), then process 400 may include requesting transfer of the call (block 460). For example, first call device 210 may request transfer of a call (e.g., a call between second call device 210 and third call device 210) when first call device 210 is a destination for the call. In some implementations, first call device 210 may request transfer of the call by transmitting a message to initiate a transfer of the call. For example, first call device 210 may transmit a vertical service code (VSC) (e.g., a particular sequence of characters and/or digits that, when dialed, causes a particular function) to telephony application server 240. The VSC, when transmitted, may facilitate a transfer of a call from second call device 210 to first call device 210. In some implementations, first call device 210 may be configured with the VSC, and may store the VSC in memory. Additionally, or alternatively, first call device 210 may receive the VSC from second call device 210, base station 220, and/or telephony application server 240. In some implementations, first call device 210 may be configured to associate an NFC event with the VSC to be transmitted. For example, first call device 210 may identify a message (e.g., a VSC) based on determining that an NFC event is associated with a call transfer request. Additionally, and/or alternatively, first call device 210 may be configured to associate an NFC event, involving a second call device 210 having a shared telephone number, with a VSC to be transmitted.

As further shown in FIG. 4, process 400 may include receiving the call (block 470). For example, the call between second call device 210 and third call device 210 may be transferred to first call device 210. Telephony application server 240 may receive the VSC from first call device 210, and may determine that first call device 210 has requested a call transfer. Telephony application server 240 may establish a call path between first call device 210 and third call device 210. Additionally, or alternatively, telephony application server 240 may terminate the call path between second call device 210 and third call device 210. First call device 210 may receive an indication to answer the call based on user input (e.g., received based on an interaction with a user prompt). Additionally, or alternatively, first call device 210 may receive the call based on telephony application server 240 establishing the call path between first call device 210 and third call device 210.

As further shown in FIG. 4, if the first call device is a source for the call to be transferred (block 450—SOURCE), then process 400 may include receiving an indication to terminate the call (block 480). For example, if first call device 210 determines that first call device 210 is the source of the call (e.g., if first call device 210 is currently on a call with third call device 210), then the call between first call device 210 and third call device 210 may be transferred to second call device 210. Second call device 210 may request a call transfer in a similar manner as described above in connection with block 460 (e.g., may transmit a VSC to telephony application server 240). Further, telephony application server 240 may transfer the call in a similar manner as described above in connection with block 470 (e.g., by establishing a call path between second call device 210 and third call device 210, and terminating a call path between first call device 210 and third call device 210). Telephony application server 240 may transmit an indication to first call device 210 to terminate the call. In some implementations, first call device 210 may receive an indication that the call has ended.

As further shown in FIG. 4, process 400 may include terminating the call (block 490). For example, telephony application server 240 may terminate the call path between first call device 210 and third call device 210. First call device 210 may be returned to a particular call state (e.g., not currently on a call) and may, for example, be capable of receiving incoming calls.

In some implementations, first call device 210 may initiate a call transfer of the call from second call device 210 back to first call device 210 via NFC. For example, assume that first call device 210 is removed from communicative proximity of second call device 210 after the call has been transferred from first call device 210 to second call device 210. First call device 210 may request a transfer of the call back to first call device 210 by being brought back into communicative proximity of second call device 210. In some implementations, a threshold amount of time may need to occur (e.g., lapse) before first call device 210 may request a transfer of the call back to first call device 210. For example, first call device 210 may be prevented from requesting a transfer of the call until a threshold amount of time has occurred. In this way, inadvertent and/or frequent call transfers between first call device 210 and second call device 210 may be prevented. Multiple call transfers (in multiple directions) may be initiated based on first call device 210 and second call device 210 establishing and/or re-establishing NFC communications by being brought within communicative proximity of each other. Moreover, a user may seamlessly transfer calls between first call device 210 and second call device 210 by simply bringing the devices within communicative proximity of one another.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may assist a user in seamlessly initiating a call transfer of an ongoing call from a first call device to a second call device via NFC without terminating the ongoing call. For example, after establishing an NFC connection with a second call device, a first call device may request a transfer of a call between the second call device and a third call device. A telephony application server may establish a new call path between the first call device and the third call device, and may start routing call signals via the new call path. Moreover, the telephony application server may stop routing call signals via an old call path between the second call device and the third call device, and may terminate the old call path. In this way, the call between the second call device and the third call device may be seamlessly transferred from the second call device to the first call device based on the NFC connection (e.g., without dropping the call).

Moreover, the first call device may transmit a VSC to the telephony application server based on the NFC connection. In this way, the call may be transferred without requiring a user to know and/or remember VSCs. The first call device and/or the second call device may save processor and/or memory resources by not having to process VSCs and/or by not having to process possibly incorrect VSCs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more processors to:
detect that a second device is within communicative proximity for a near field communication connection with the first device;
establish the near field communication connection with the second device based on detecting that the second device is within communicative proximity for the near field communication connection with the first device;
determine that the first device and the second device are provisioned with a same telephone number after establishing the near field communication connection;
determine that the first device is a destination for a call to be transferred,
the call being between the second device and a third device that is different from the first device; and
request a transfer of the call based on determining that the first device and the second device are provisioned with the same telephone number and based on determining that the first device is the destination for the call to be transferred.

2. The first device of claim 1, where the one or more processors are further to:
receive the call based on requesting the transfer of the call.

3. The first device of claim 2, where the one or more processors are further to:
prevent a transfer of the call from the first device to the second device for a threshold amount of time after receiving the call.

4. The first device of claim 1, where the one or more processors, when determining that the first device is the destination for the call to be transferred, are to:
determine that the first device is not on a call with another device; and determine that the first device is the destination for the call to be transferred based on determining that the first device is not on the call with the other device.

5. The first device of claim 1, where the first device is a wireline telephone; and
where the second device is a wireless telephone.

6. The first device of claim 1, where the one or more processors, when requesting the transfer of the call, are to:
transmit a vertical service code that causes the call to be transferred.

7. The first device of claim 1, where the same telephone number is a first telephone number, and
where the first device is provisioned with the first telephone number and a second telephone number,
the second telephone number being different than the first telephone number.

8. A non-transitory computer-readable medium storing instructions, the instructions comprising:
one or more instructions that, when executed by one or more processors of a first call device, cause the one or more processors to:
establish a near field communication connection with a second call device in communicative proximity of the first call device;
determine that the second call device and the first call device are provisioned with a same telephone number after establishing the near field communication connection with the second call device;
determine that the first call device is a destination for a call to be transferred,
the call being between the second call device and a third call device that is different from the first call device; and
transmit a message to initiate a transfer of the call based on determining that the first call device is the destination for the call to be transferred.

9. The non-transitory computer-readable medium of claim 8, where the one or more instructions, that cause the one or more processors to determine that the first call device is the destination for the call to be transferred, cause the one or more processors to:
receive information, from the second call device, that indicates that the first call device is the destination for the call to be transferred; and
determine that the first call device is the destination for the call to be transferred based on receiving the information from the second call device.

10. The non-transitory computer-readable medium of claim 8, where the message includes a vertical service code.

11. The non-transitory computer-readable medium of claim 10, where the vertical service code is received from the second call device.

12. The non-transitory computer-readable medium of claim 8, where the one or more instructions, when executed by the one or more processors, further cause the one or more processors to:
detect a near field communication event when the second call device is within communicative proximity of the first call device;
determine that the near field communication event is associated with a call transfer request; and
where the one or more instructions, that cause the one or more processors to transmit the message to initiate the transfer of the call, cause the one or more processors to:
identify the message based on determining that the near field communication event is associated with the call transfer request; and
transmit the message based on identifying the message.

13. The non-transitory computer-readable medium of claim 8, where the message includes a vertical service code; and
where the one or more instructions, when executed by the one or more processors, further cause the one or more processors to:
determine the vertical service code based on determining that the second call device and the first call device are provisioned with the same telephone number.

14. The non-transitory computer-readable medium of claim 8, where the one or more instructions, when executed by the one or more processors, further cause the one or more processors to:
detect a near field communication event when the second call device is within communicative proximity of the first call device; and
determine a vertical service code based on detecting the near field communication event, the message including the vertical service code.

15. A method, comprising:
establishing, by a first device, a near field communication connection with a second device based on the second device being within communicative proximity of the first device;
determining, by the first device, that the first device and the second device are associated with a same telephone number based on establishing the near field communication connection;
determining, by the first device, whether the first device is a source or a destination for a call to be transferred; and
selectively transmitting, by the first device, a call transfer request based on determining whether the first device is the source or the destination for the call to be transferred,
the first device transmitting the call transfer request when the first device is the destination for the call to be transferred, and not when the first device is the source for the call to be transferred.

16. The method of claim 15, where determining whether the first device is the source or the destination for the call to be transferred comprises:
determining that the first device is the destination for the call to be transferred; and
where selectively transmitting the call transfer request comprises:
transmitting the call transfer request to a telephony application server based on determining that the first device is the destination for the call to be transferred.

17. The method of claim 15, where determining whether the first device is the source or the destination for the call to be transferred comprises:
determining that the first device is the source for the call to be transferred; and
where the method further comprises:
receiving an indication to terminate the call after determining that the first device is the source for the call to be transferred and after the call has been transferred to the second device.

18. The method of claim 15, where the first device is a first wireless telephone; and
where the second device is a second wireless telephone.

19. The method of claim 15, where the first device is a wireless telephone; and
where the second device is a wireline telephone.

20. The method of claim 15, where the call transfer request comprises a vertical service code.

* * * * *